Aug. 8, 1967

M. S. PURCHINSKY 3,335,250

ARRANGEMENT FOR ELECTROMAGNETIC
STIRRING OF MELTED METALS

Filed Dec. 29, 1964

United States Patent Office 3,335,250
Patented Aug. 8, 1967

3,335,250
ARRANGEMENT FOR ELECTROMAGNETIC
STIRRING OF MELTED METALS
Miroslav Stanislavovich Purchinsky, Moscow, U.S.S.R., assignor to Moscowsky Institute Stali i Splavov, Moscow, U.S.S.R.
Filed Dec. 29, 1964, Ser. No. 421,907
1 Claim. (Cl. 219—10.43)

ABSTRACT OF THE DISCLOSURE

An arrangement for electromagnetic stirring of molten metals in which an electromagnet produces a rotating magnetic field, and a ladle with molten metal is disposed between split poles of said electromagnet on which are placed short circuited rings. A thermal screen of non-ferromagnetic material is disposed between a heater and the magnetic circuit of the electromagnet.

---

The present invention relates to the production of ultra pure metals as well as semiconductor materials, and relates, more particularly, to arrangements of electromagnetic stirring of melted metals.

The method of forced convection widely used to intensify various metallurgical processes is of particular importance in the manufacture of semiconductor materials and pure metals.

In the majority of metallurgical processes, irregular liquid phase concentration and the presence of temperature gradients adversely affect the effectiveness of processes in full-scale industrial apparatus. The method of forced convection aids in promoting the industrial processes.

Metals in liquid phase are mixed by the usual mechanical stirrers which are directly introduced into the working medium. The use of such stirrers in metallurgical processes is a troublesome problem, because of the tendency of the material in the stirrer to interact with the melted metal, necessitating the use of intricate auxiliary equipment. Barbotage mixing is widely used in stirring metals, wherein gas bubbles rising through the melted material effect intensive mixing of the liquid phase. Said method of barbotage mixing, however, is not utilized in the production of pure metals because of the inconvenience of the apparatus used therein, and also because most processes of manufacturing pure metals are effected in a vacuum.

The experiments of the American metallurgist W. G. Pfann are well known (consult, for instance, Zone Melting, by W. G. Pfann, N.Y., 1958). In order to stir metals in the melting zone a method was used by Mr. Pfann based on the interaction between an external magnetic field and an electric current passing through an ingot. However, when electric power is directly supplied to the ladle significant difficulties arise because of the danger of contaminating the melted metal with the wiring materials.

The use of arrangements having special devices for stirring metals e.g. in the form of a three-phase electric motor stator inducing a rotating magnetic field has opened new horizons in stirring melted metals since there is no longer a need to direct by supply power to the metal. References: J. Braun, F. G. Frank, S. Marshall, G. Meyrick. Electromagnetic Stirring in Zone Refining. Philos. Mag., vol. 3, No. 26, pp. 208–209 (1958), and J. B. Mullin, K. F. Hulme. The use of electromagnetic stirring in zone refining. J. Eletron Contr., vol. 4, No. 2, pp. 170–174 (1958). As stated by Mullin and Hulme, the application of such devices for stirring melted tin allows raising the speed of crystallization from 2.5 to 20 cm./h. with the degree of purity being the same and, thus, an eightfold increase in productivity is attained.

In the arrangement described in the reference literature the three-phase electric motor stator inducing the rotating magnetic field in zone melting is outside the heating device and is separated from it by a specially cooled shell. It should be noted, however, that some essential disadvantages are inherent in this arrangement, i.e. the low efficiency of the rotating magnetic field and the intensive heat diversion at the expense of the water-cooled shell. The rotating magnetic field has a low efficiency, because the electric magnets in the three-phase stator are disposed at a comparatively large distance from the melting zone, being separated from it by a heater with massive thermal insulation and a water-cooled shell. The unfavorable proportions between the size of the electric magnet and the ingot's cross-section cause the dissipation of the major part of the magnetic field and therefore the melting zone becomes influenced by only a relatively small part of its energy.

Intensive heat losses are produced by the presence of said massive water-cooled shell.

It is an object of this invention to improve the arrangement for electromagnetic stirring of melted metals and ensure a more effective use of the rotating magnetic field as compared with the known arrangements.

Another object of this invention is to create an arrangement for electromagnetic stirring of melted metals which is compact, safe in operation and based on the application of the rotating magnetic field principle.

Still another object of the invention is to attain a higher efficiency in stirring melted metals as compared with the known arrangements with less power consumed by the electromagnet and a more effective use of the furnace heater.

The problem set forth hereinabove are solved in compliance with the present invention by using a single-phase A.C. electromagnet with split poles supplied with short-circuited windings to induce a rotating magnetic field.

For better understanding of the invention there is next given a detailed description of an embodiment thereof.

The embodiment of the invention is described with reference to the accompanying drawings in which.

Figure 1:
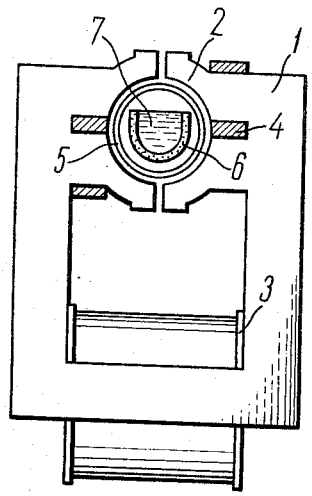
FIG. 1 is a schematic cross-section of a device for effecting electromagnetic stirring of metals in zone melting.
Figure 2:
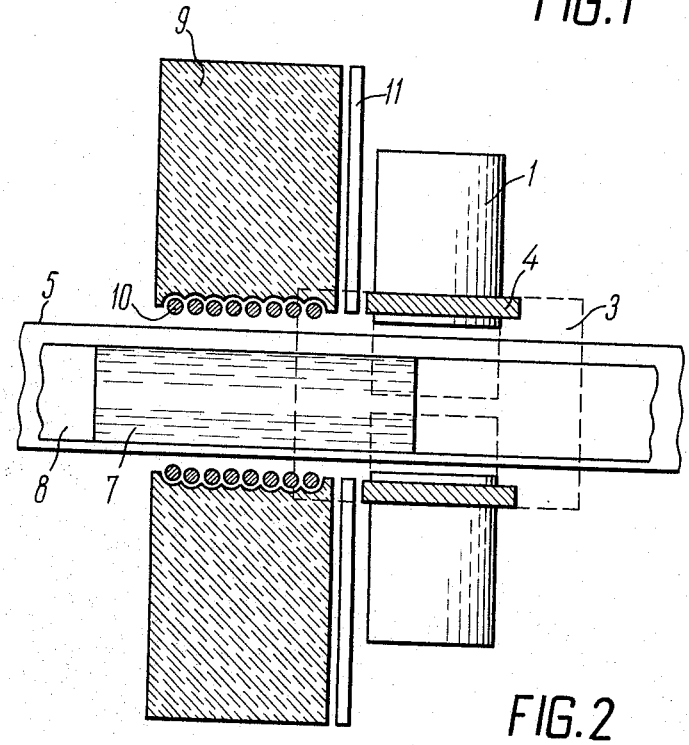
FIG. 2 is a longitudinal section of a part of said device.

The following designation is adopted in FIGS. 1 and 2; 1—magnetic circuit of an electromagnet; 2—split poles; 3—electromagnet winding; 4—short-circuited copper rings; 5—quartz tube; 6—graphite ladle; 7—melted metal; 8—solid metal; 9—thermal insulation; 10—heater; 11—thermal screen from a non-ferromagnetic material (a water-cooled material for the particular case). Winding 3 powered by single-phase alternating current is coupled to magnetic circuit 1 with split poles 2. Short-circuited copper rings 4 are disposed on each side of the split poles. Due to these copper rings, in which the induced current significantly differs in phase from the current powering winding 3, a rotating magnetic field is induced and passes through melted metal located in the immediate vicinity of the electromagnet's poles. The rotating magnetic field ensures the stirring of melted metal 7 in graphite ladle 6 installed in quartz vacuum tube 5.

Figure 3:
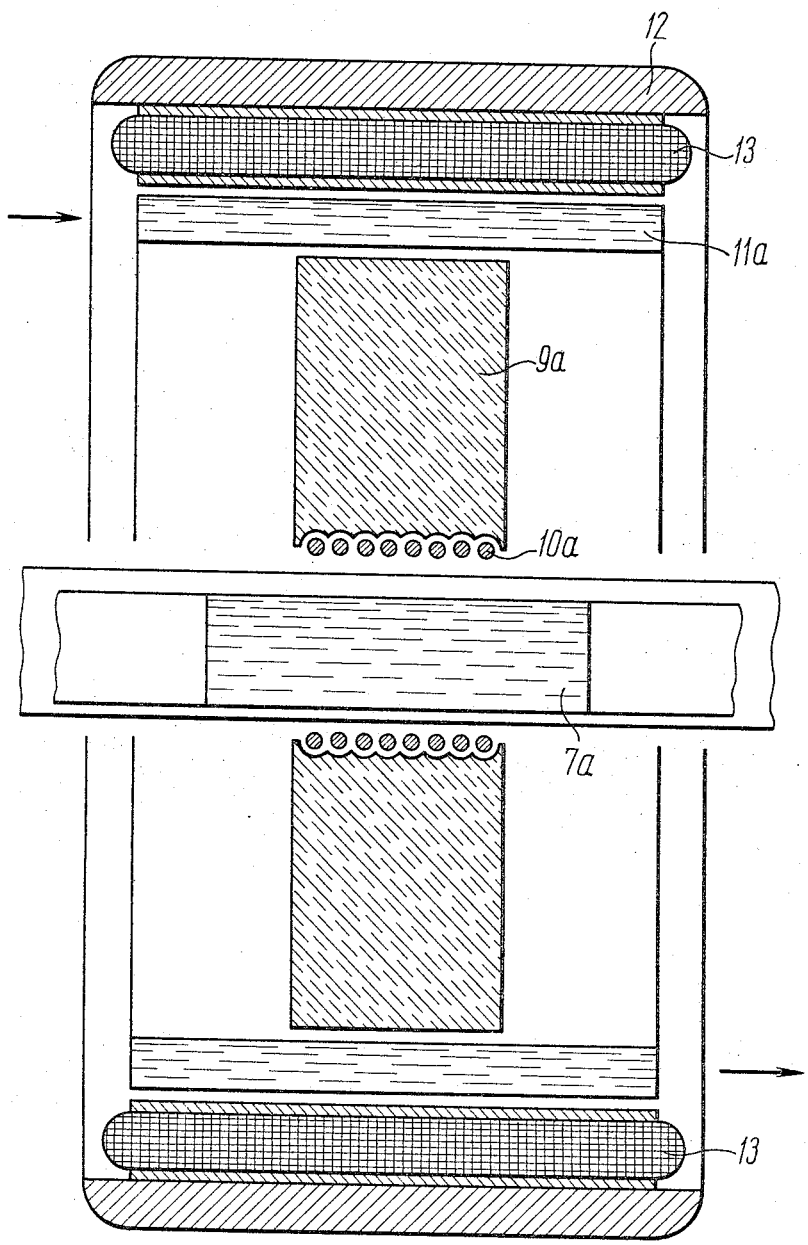
FIG. 3 is a longitudinal section of a known arrangement for effecting the same purpose and is illustrated for the sake of comparison.

A comparison of the described arrangement with the known one illustrated in FIG. 3 shows that in the known arrangement having a device such as a three-phase stator of an induction motor and also comprising a shell 12, coil 13, water-cooled screen 11a, encompassing completely heater 10a, and massive thermal insulation 9a, located in this case between coils 13 and heater 10a, the magnetic field cannot effectively be used in stirring the metal, because of the large spacing between the coils of the electromagnet and the melted metal. The water-cooled screen concentrically surrounding the heater adversely affects its efficiency.

In contrast to the application of an electromagnet with a coil remotely disposed from the heater, the arrangement according to the invention allows placement of the magnetic circuit inducing the rotating magnetic field closer to the heater, so that the split poles of the electromagnet encompass the ladle closely in the melting zone and thus reduce the dissipation of the magnetic field to a minimum ensuring meantime a small power consumption of the electromagnet, resulting in a higher efficiency of metal stirring.

A single thermal screen, disposed as in FIG. 2, has proved to be sufficient, and hence a higher economic efficiency of the heater is achieved. Tests of the suggested arrangement established that the efficiency of metal stirring could be further increased by distorting the rotating magnetic field, namely by shifting the plane of its rotation from that perpendicular to the longitudinal axis of the quartz tube thereby resulting in asymmetrical disposition of both the split poles and the superimposed short-circuited ring.

At the same time, the proposed arrangement according to the invention allows to diminish the overall dimensions as compared with the known designs.

The tests carried out with this arrangement proved its high efficiency and reliability in operation.

What I claim is:

An arrangement for electromagnetic stirring of melted metals in zone melting, comprising an electromagnet to induce a rotating magnetic field with a magnetic circuit coil powered by a single-phase alternating current and split poles whereon short-circuited rings are superimposed, a ladle with molten metal, said ladle being encompassed by said split poles, a heater for the metal in said ladle, said heater being spaced from the electromagnet, and a thermal screen of non-ferromagnetic material disposed between the heater and the magnetic circuit of said electromagnet.

References Cited
UNITED STATES PATENTS

| | | | |
|---|---|---|---|
| 2,719,799 | 10/1955 | Christian | 148—1 |
| 2,826,666 | 3/1958 | Cater | 219—10.65 |
| 3,124,633 | 3/1964 | Vav Run | 13—1 |
| 3,203,768 | 8/1965 | Filler et al. | 219—10.43 X |

RICHARD M. WOOD, *Primary Examiner.*

L. H. BENDER, *Assistant Examiner.*